United States Patent [19]

Breuer et al.

[11] Patent Number: 5,125,775
[45] Date of Patent: Jun. 30, 1992

[54] METHOD FOR MACHINING A WORKPIECE BY END-FACE CUTTING TOOL

[75] Inventors: Edgar Breuer, Rorschachersberg; Andreas Hauswirth, Heiden, both of Switzerland

[73] Assignee: Starrfrasmaschinen AG, Rorschacherberg, Switzerland

[21] Appl. No.: 576,082

[22] Filed: Aug. 28, 1990

Related U.S. Application Data

[63] Continuation of Ser. No. 272,576, Nov. 17, 1988, abandoned.

[30] Foreign Application Priority Data

Nov. 20, 1987 [CH] Switzerland ............. 4517/87

[51] Int. Cl.$^5$ .............................................. B23C 3/00
[52] U.S. Cl. .................................. 409/132; 51/281 C; 409/199
[58] Field of Search ............... 82/18; 409/143, 165, 409/166, 167, 168, 228, 131, 132, 199, 200, 142, 201, 164, 95, 119, 120, 211, 138; 407/54; 51/281 C, DIG. 14, 127

[56] References Cited

U.S. PATENT DOCUMENTS

| | | | |
|---|---|---|---|
| 1,476,593 | 12/1923 | Coffey | 409/131 |
| 2,008,474 | 7/1935 | Smith | 82/18 |
| 2,480,807 | 8/1949 | deVlieg | 409/119 |
| 2,909,010 | 10/1959 | Zelewsky | 51/DIG. 14 |
| 4,031,809 | 6/1977 | Shraiman et al. | 409/132 |
| 4,104,943 | 8/1978 | Calderoni . | |
| 4,260,304 | 4/1981 | Jacobi | 409/132 |
| 4,533,286 | 8/1985 | Kishi et al. | 409/131 |
| 4,624,610 | 11/1986 | Phillips et al. | 51/281 C |

FOREIGN PATENT DOCUMENTS

| 867636 | 1/1953 | Fed. Rep. of Germany | 409/201 |
|---|---|---|---|
| 566390 | 12/1944 | United Kingdom | 409/120 |

Primary Examiner—Daniel W. Howell
Attorney, Agent, or Firm—Carl J. Evens

[57] ABSTRACT

A tool for abrading workpieces having random, convex, concave, planar or curved surfaces has a conically convex end face. When working a workpiece, the tool acquires an inclination transversely to the feed direction, so that the tool with the contact line is located on the workpiece. This leads to the same conditions as exist in the rotary milling of convexly curved surfaces when machining concave surfaces of the workpiece. Finest surface characteristics are obtained on the workpiece by the tool and the method of machining with this tool.

7 Claims, 2 Drawing Sheets

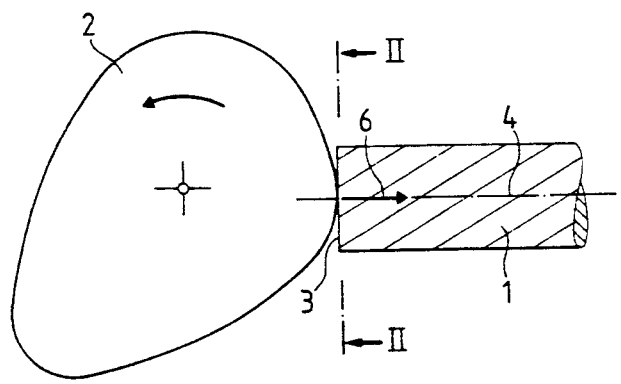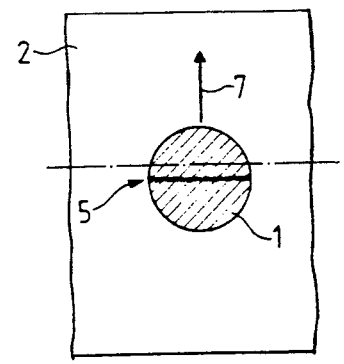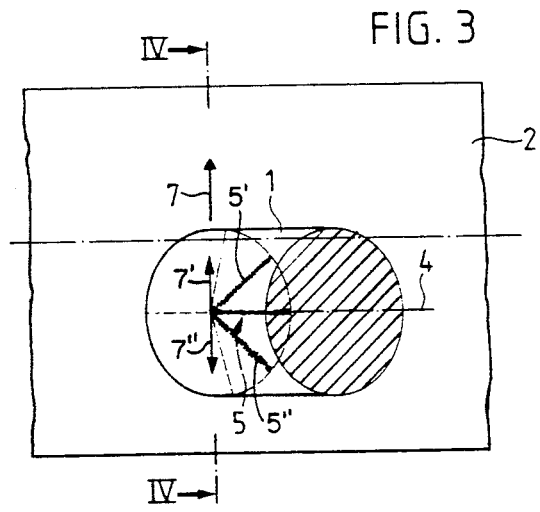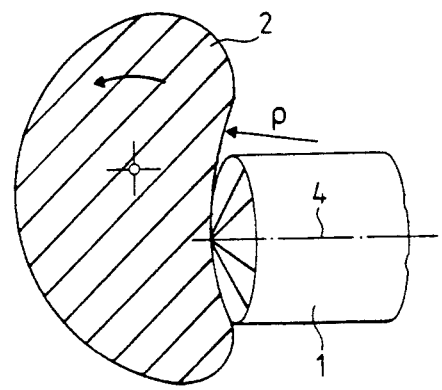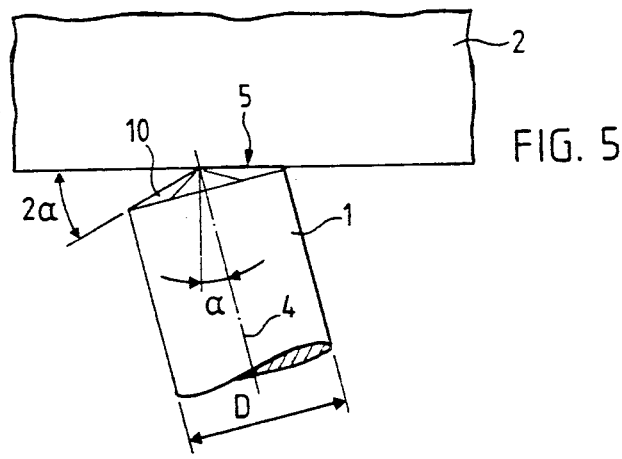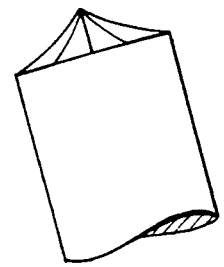

METHOD FOR MACHINING A WORKPIECE BY END-FACE CUTTING TOOL

This is a continuation of copending application Ser. No. 07/272,576 filed on Nov. 17, 1988 now abandoned.

BACKGROUND OF THE INVENTION

The present invention relates to a method for the abrading machining of a workpiece with random convex and/or concave, planar or curved surfaces, by means of at least one end-face cutting tool, the orientation of which relative to the surface of the workpiece is set in such a way that the contact line or curve or the contact point between the tool and the workpiece surface is located on the end face of the tool, as well as to a tool for performing this method.

Of the various known methods for the machining of the surfaces of a workpiece, without doubt, turning or rotary milling is one of the most suitable machining methods for producing a cylindrical or disk-like workpiece with excellent surface characteristics. Surfaces produced by such method are equivalent as regards quality to ground and polished workpiece surfaces and can even satisfy optical requirements. Examples of such surfaces are metal mirrors, printing rollers and similar workpieces.

If it is desired to obtain very fine surfaces by milling cutting, appropriately consideration is given to the rotary or turning milling method. However, the restriction exists in the application of such method to workpieces in which it is possible to work cylindrical shapes having throughout a convex cross-section up to a maximum of planar contours using the planar end face of a milling tool. This method does not make it possible to machine concave surfaces on workpieces. Thus, the known method is restricted to cylindrical to slightly domed workpieces with a convex cross-section. If it is necessary to machine randomly curved surfaces on workpieces, particularly those having concave portions, it is necessary to choose a different machining method.

A milling method frequently used in such cases, in which a shank-type milling cutter referred to as a ball-end cutter, having a spherical end and using three translatory movement axes at right angles to one another, is guided on planar or spatially curved paths over the workpiece, leads to a relatively rough surface at right angles to the feed direction and also in the feed direction. However, accessibility is very good, i.e. there are few collision problems, which normally reside in reciprocally disturbing or interfering positions between the milling cutter with its spindle and the workpiece with any random holding device.

Another milling method for machining random surfaces of workpieces is the method referred to as collapse or collision milling, which is carried out using five movement axes. As a result of the closer adaptation of the milling cutter edge to the surface of the workpiece in this method, the side roughness is significantly reduced, but a considerable roughness occurs in the feed direction due to the traces of the individual cutter teeth. Generally, accessibility is adequate, because the collision problems are only solved to an insignificantly inferior extent than in the case of triaxial methods with ball-end milling cutters.

Another known machining method for random surfaces of workpieces is the circumferential and flank milling, which is performed with cylindrical or disk-shaped milling cutters. In the case of circumferential milling with a cylindrical milling cutter the feed takes place in a direction substantially at right angles to the milling cutter axis. As a function of the cutter construction a very good roughness can be obtained in the feed direction and also at right angles thereto.

However, due to the fact that the cutter axis must be parallel or almost parallel to the workpiece surface, the accessibility is greatly restricted due to the collision problems which occur. The use of such method is consequently limited to a few applications, e.g. to the machining of turbine blades.

SUMMARY OF THE INVENTION

It is an object of the present invention to extend the aforementioned rotary milling method to randomly curved and in particular concave surfaces of workpieces, so as to render superfluous further machining steps for surface improvement purposes, e.g. for grinding or polishing.

This and other objects of the invention are attained by a method of and a tool for abrading machining, wherein the tool axis forming the rotation axis of the tool is set substantially perpendicular to the feed direction, but is inclined with respect to the workpiece surface, the end face of the tool being shaped so as to correspond to the inclination set transversely to the feed direction relative to the surface of the workpiece.

The invention also covers a tool enabling the method to be performed in an optimal manner. According to the invention this is attained in that the end face of the tool is domed or is conically convex.

The invention is described in greater detail hereinafter relative to non-limitative embodiments and the attached drawings.

BRIEF DESCRIPTION OF THE DRAWINGS

FIG. 1 is a diagrammatic representation of the milling cutter for working a cylindrical workpiece with a convex cross-sectional surface according to the prior art;

FIG. 2 is a sectional view along line II—II of FIG. 1;

FIG. 3 is a diagrammatic view of the extended rotary milling method on a workpiece with partly concaved cross-sectional surface;

FIG. 4 is a sectional view along line IV—IV of FIG. 3;

FIG. 5 is a side view of the arrangement according to FIG. 3;

DETAILED DESCRIPTION OF THE PREFERRED EMBODIMENTS

Figure 6:
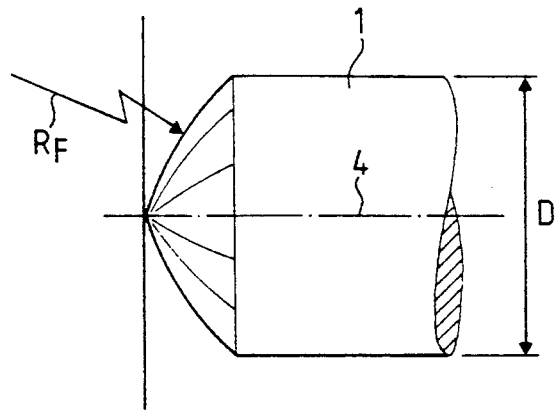
FIG. 6 is a schematic view of an embodiment of a milling cutter for performing the inventive method.

The present invention is based on the idea that the rotary milling method can also be extended to the machining of concave surfaces of workpieces with milling cutters, but also other abrading or material removing tools. The known rotary milling method is diagrammatically illustrated in FIGS. 1 and 2. For this purpose use is made of a cylindrical tool 1, the planar end face 3 of which works the surface of a cylindrical workpiece 2. Workpiece 2 has a profile, whose cross-section only has convex portions. On mounting the tool 1 on workpiece 2, there is linear contact in the form of a contact line 5, which passes through the tool axis 4 between tool 1 and workpiece 2. Tool axis 4 and the local surface normal 6 of workpiece 2 coincide. However, there is a true linear contact between tool 1 and workpiece 2, which leads to the finest surface quality of the tool surface. It is known t use rotary milling methods for the machining of printing roller with diamond tools. Much better results with regards to the surface quality are obtained than through any grinding and polishing procedure. However, this method fails in the case of concave profile parts of a workpiece.

In FIGS. 3 to 5, end face milling with linear contact is also realized in the case of concave cross-sectional profiles. An end face 10 of tool 1 is slightly conically ground to obtain a linear contact and the tool 1 is inclined to the side at the cone angle $\alpha$. As seen in FIGS. 1 and 2, the cutter axis is substantially perpendicular to feed direction 7. However, according to FIGS. 3 and 5 the contact line 5 only covers half the cutter diameter D, but there is still a true linear contact and now it is possible to work concave curvature radii $\rho$, cf. FIG. 4. The smallest concave radius of curvature which can be worked is obtained in the case of cylindrical workpieces from the projection of the contour of the end face in the direction of the workpiece axis, with the references used in FIG. 5, from the following formula:

$$\rho_{min} = \frac{D}{2 \cdot \sin\alpha}$$

In the case of the machining of double curved workpiece surfaces, as is the case e.g. with twisted turbine blades, it is not generally possible to obtain an ideal linear contact.

In the case of workpiece surfaces with double convexly curved surfaces, machining can take place with a conical or cylindrical tool. The close adaptation of the end face of the tool takes place in the direction of the smallest convex curvature. In this case of doubly curved workpiece surfaces, it may be recommendable to utilize conical tools with concavely shaped cone faces, see FIG. 10, the radius of curvature of these faces being equal to or slightly larger than in largest radius of curvature of the workpiece surface.

If convex-concave curved surfaces are machined, use can be made of a conical tool, in which the end face of the tool must satisfy the above formula with $\rho$ corresponding to the smallest concave radius of curvature which occurs. The direction in which curvature is smallest may, in principle, form any angle with respect to the direction of feed. Referring to FIG. 3, in case this is not a right angle, the direction of inclination of the tool axis will have to be set with a component in the feed direction 7' or counter to it 7", respectively, so as to yield a contact line (5' or 5", respectively) in the direction of minimal curvature.

However, it is also possible to work double concavely curved surfaces, using a tool, whose conical end face is rounded with a flank radius $R_F$, cf. FIG. 6. The end face of the tool must in such cases be adapted to the curvatures, it being possible to take $R_F$ as the value for the smallest secondary radius of curvature, whilst the above formula applies to the smallest primary radius of curvature. The terms primary and secondary radius of curvature are understood to mean the small and large main curvature radius of a double concave surface.

Figure 7:
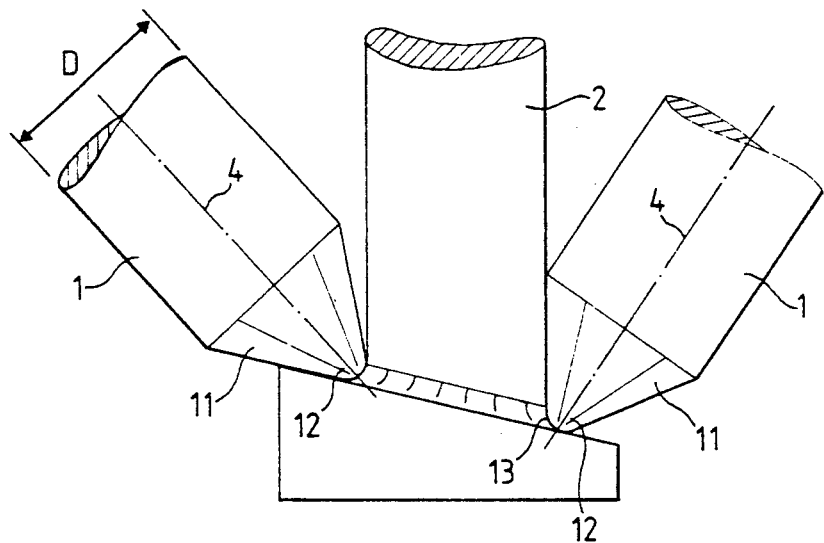
FIG. 7 is a schematic view of an embodiment of a milling cutter for machining a rounded transition between two adjacent surfaces, e.g. between a turbine blade base and end, in accordance with the method of the present invention.

A particular application of the described method occurs in the machining of the transition area between two adjacent surfaces, e.g. between a turbine blade and its base. The tool 1 is used, the end face of which is constructed as a cone 11 with a head 12 shaped in the form of a spherical cup. According to FIG. 7, machining takes place in such a way a rounding radius 13 and one of the adjacent surfaces of the workpiece are machined simultaneously. As in the previously described cases, here again, the limit data, i.e. the smallest value $R_F$ and the smallest angle $\alpha$ for a given diameter D, must be determined for the tool, as was explained hereinbefore.

Figure 8:
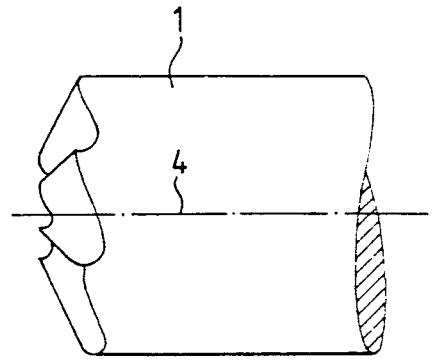
FIG. 8 is a schematic side view of an embodiment of a further milling cutter constructed as a truncated cone for performing the inventive method.

In certain cases the tool is used, the end face of which is constructed as a truncated cone with or without a center cutting edge, cf. FIG. 8.

Thus, the described method makes it possible to obtain a very good surface quality on workpieces, as is also the case with rotary milling. There is an all-sided, very good accessibility, because the tool can be inclined to the right or to the left, as seen in the direction of feed, but is always substantially perpendicular to the workpiece surface. As only one half of the tool end face engages, it is possible in most cases to realize constant cutting conditions, i.e. a purely climb-cut or a purely up-cut.

In the case of a constant feed direction, such as occurs with all-round milling, which is similar to rotary milling, in the case of contour or spiral paths, or in the box cycle method, constant cutting conditions are obtained through a constant inclination of the tool, e.g. always to the right as seen in the feed direction.

Figure 9:
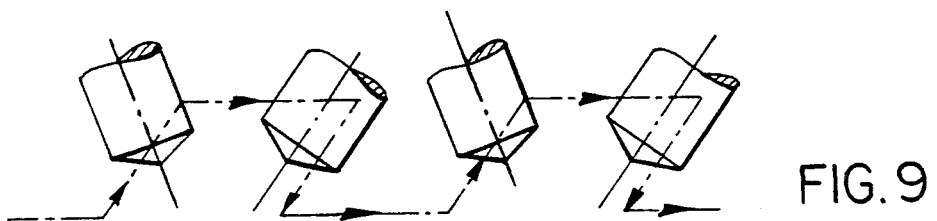
FIG. 9 is a schematic representation of the orientation of the milling cutter in reciprocating cell milling, which illustrates a change of the direction of inclination of the milling cutter as the feed direction is changed; and, FIG. 10 shows a tool having concavely curved cone end faces.

In the case of a varying feed direction, as is the case with the conventional reciprocating cell milling, a constant inclination with respect to the feed direction can be maintained. This means that whenever the feed direction is reversed, the direction of the inclination of the milling cutter is tilted to the opposite side as shown in FIG. 9.

The flat, almost tangential access of the tool cutting edge to the contact point or line and the fact that the milling force is substantially tangential to the too surface, with only a small component at right angles thereto means that even in the case of not very stable workpieces, a very quiet and stable cutting is obtained.

If randomly curved surfaces are worked by grinding, in general six movement axes are required. In the present method only five movement axes are necessary, which leads to a simpler machine construction and a simpler machining program. Of these five axes of motion, three are the linear axes extending in mutually perpendicular directions, while two rotary axes are employed for the cutter axis to be oriented in any desirable direction in space, in particular in a direction inclined with respect to the local surface normal on a curved surface. It is of no importance to the present invention how these fixed axes are realized in a particular machine tool and such realization will be easily envisioned by anyone skilled in the art.

The end face of the tool may be convexly curved.

The end face of the tool may be conically convex.

The tool may be used as a polishing tool, milling tool, lapping tool, or any other abrading tool.

The description has been directed at a random abrading tool, whilst in the drawings the tools are shown in the form of milling cutters. Numerous different milling cutters are suitable for the described method, but the latter is not restricted to this single tool type.

What is claimed is:

1. A method for abrading a concave surface on a workpiece surface comprising the steps of:
   rotating around a tool axis a cutting tool having at least a partially conical end face defining a cutting edge for abrading the workpiece surface;
   aligning the cutting edge in a direction substantially perpendicular to the direction of concavity;
   inclining the tool axis in a direction substantially perpendicular to the direction of concavity;
   feeding the workpiece surface to the cutting edge; and
   abrading the concave surface on the workpiece surface with the cutting edge.

2. A method according to claim 1 wherein the conical end face is convexly rounded.

3. A method for abrading a doubly concave surface on a workpiece surface, the double concave surface having a maximum concavity in one direction and a minimum concavity in another direction, comprising the steps of:
   rotating a cutting tool having an end face with at least a partially convex surface defining a curved rotational cutting edge for abrading the work surface, the cutting edge having a radius of curvature approximately equal to or less than the radius of maximum concavity;
   inclining the cutting tool in a direction substantially perpendicular to the direction of maximum concavity;
   feeding the workpiece surface to the cutting tool in a direction substantially coinciding with the direction of maximum concavity; and
   abrading the double concave surface on the workpiece with the cutting edge.

4. A method according to claim 3 wherein the cutting tool has a rounded conical end face.

5. A method for abrading a workpiece having surfaces that are concave in one direction, which comprises the following steps:
   (a) guiding a cutting tool having a conically-formed end face to the surface of a workpiece such that the end face forms a contact line or contact point with the workpiece surface;
   (b) setting the tool axis forming the rotation axis of the tool substantially perpendicular to the direction of motion of the cutting tool relative to the workpiece;
   (c) inclining the tool axis with respect to the workpiece surface essentially perpendicular to the lateral direction of concavity whereby the end face coincides with the tangent plane of the workpiece surface;
   (d) moving the end face of the cutting tool relative to the workpiece surface while rotating the cutting tool, thereby removing controlled amounts of material from the workpiece surface; and
   wherein the steps include angular movement in up to five different axes with respect to the workpiece, said five axes including three mutually perpendicular directions of linear movement of the tool and two axes of rotation of the tool whereby said axis of the tool can assume any desired direction of movement in space.

6. A method for abrading a workpiece having surfaces that are concave in both directions, which comprises the following steps:
   (a) guiding a cutting tool having a convexly-formed end face to the surface of a workpiece such that the end face forms a contact line or contact point with the workpiece surface;
   (b) setting the tool axis forming the rotation axis of the tool substantially perpendicular to the direction of motion of the cutting tool relative to the workpiece surface;
   (c) inclining the tool axis with respect to the workpiece surface essentially in the direction of minimum negative curvature which is perpendicular to the direction of maximum curvature, whereby the tangent of the end face of the cutting tool at the contact line or contact point coincides with the tangent plane of the workpiece surface and whereby the curvature of the end face is equal to or slightly larger than the curvature of the workpiece surface, resulting in an optimum area of contact between the workpiece surface and the end face of the cutting tool;
   (d) moving the end face of the cutting tool relative to the workpiece surface while rotating the cutting tool, thereby removing controlled amounts of material from the workpiece surface; and
   wherein the cutting tool is movable in up to five movement axes with respect to the workpiece, said five movement axes including three mutually perpendicular directions of linear movement of the tool and two axes of rotation of the tool whereby said axis of the tool can assume any desired direction of movement in space.

7. Method for abrading machining of workpieces with random, convex, concave, planar or curved surfaces by means of an end face cutting tool, an orientation of which relative to a workpiece surface is set in such a way that a contact line or contact point between the tool and the workpiece surface is located on an end face of the tool, the method comprising the steps of setting a tool axis forming a rotation axis thereof substantially a right angles to an instantaneous feed direction but at an inclination to the workpiece surface, said inclination extending substantially transversely to the lateral feed direction, wherein the end face of the tool is shaped in such a way that it corresponds to the workpiece surface at a place of contact with said face while the tool is inclined, and wherein the tool has a convexly curved end face adapted to machine concave surfaces of the workpiece, wherein the radius of curvature of the tool is selected to be at most equal to the smallest concave radius of curvature of the surface; and wherein the cutting tool is movable in up to five movement axes with respect to the workpiece, said five movement axes including three mutually perpendicular directions of linear movement of the tool and two axes of rotation of the tool whereby said axis of the tool can assume any desired direction of movement in space.

* * * * *